United States Patent Office.

SYLVESTER P. WHEELER, OF BRIDGEPORT, CONNECTICUT.

Letters Patent No. 107,428, dated September 13, 1870; antedated September 5, 1870.

IMPROVEMENT IN COATING EMBOSSED WOOD.

The Schedule referred to in these Letters Patent and making part of the same.

I, SYLVESTER P. WHEELER, of Bridgeport, county of Fairfield, State of Connecticut, have invented a Process of Treating Wood, of which the following is a specification.

Nature and Object of the Invention.

My invention consists in the manufacture of ornamental articles of wood, by first embossing blocks of wood, and then coating the same with collodion, chloride of sulphur, or equivalent material.

My invention further consists in embossed imitations of carved or turned wood, produced as described hereafter.

General Description.

In carrying out my invention, I first prepare a strong collodion in about the proportion of two or three grains of gun-cotton to the fluid ounce of ether or alcohol.

In this collodion I dip the article to be treated, and when, by exposure to the air, the ether or alcohol has evaporated, there is formed on the article a hard, smooth coating or surface, capable of being oiled or varnished, and of receiving a high polish.

This treatment is especially useful for embossed imitations of carved or turned wood, formed by dies upon the end grain of the wood, and rendered impervious to moisture by impregnation with wax, or with paraffine, or equivalent fatty matter.

The treatment may, however, be applied with advantage to the like articles which have been impregnated with a solution of caoutchouc. In either case the collodion tends to fix the fibers of the wood, and to increase the water-proof quality of the article treated, and forms a hard, smooth surface, capable of being oiled or varnished, and of receiving a brilliant polish.

Instead of collodion, I have found a coating of chloride of sulphur to answer the same purpose, this coating being obtained by dipping the articles in a bath of chloride of sulphur sufficiently diluted in naphtha to prevent injurious action upon the fiber of the wood.

Fluoride of sulphur, bromide of sulphur, or iodide of sulphur, may be used instead of chloride of sulphur, which last is preferable, however, because more economical.

I do not here claim, broadly, the application of the paraffine to articles of wood molded by dies applied to the end of the grain, as this forms the subject of another application for Letters Patent.

Claims.

1. The manufacture of ornamental articles of wood, by first embossing blocks of wood by dies applied to the end grain, and then treating the same with collodion, as described.

2. Embossed imitations of carved or turned wood, subjected to the said treatment.

3. Embossed imitations of carved or turned wood, impregnated with paraffine or with fatty or other matter, and coated with collodion, chloride of sulphur, or its equivalent.

In testimony whereof I have signed my name to this specification in the presence of two subscribing witnesses.

SYLVESTER P. WHEELER.

Witnesses:
WM. A. STEEL,
HARRY SMITH.